No. 862,776. PATENTED AUG. 6, 1907.
W. L. WATERS.
DYNAMO ELECTRIC MACHINERY.
APPLICATION FILED DEC. 9, 1905.
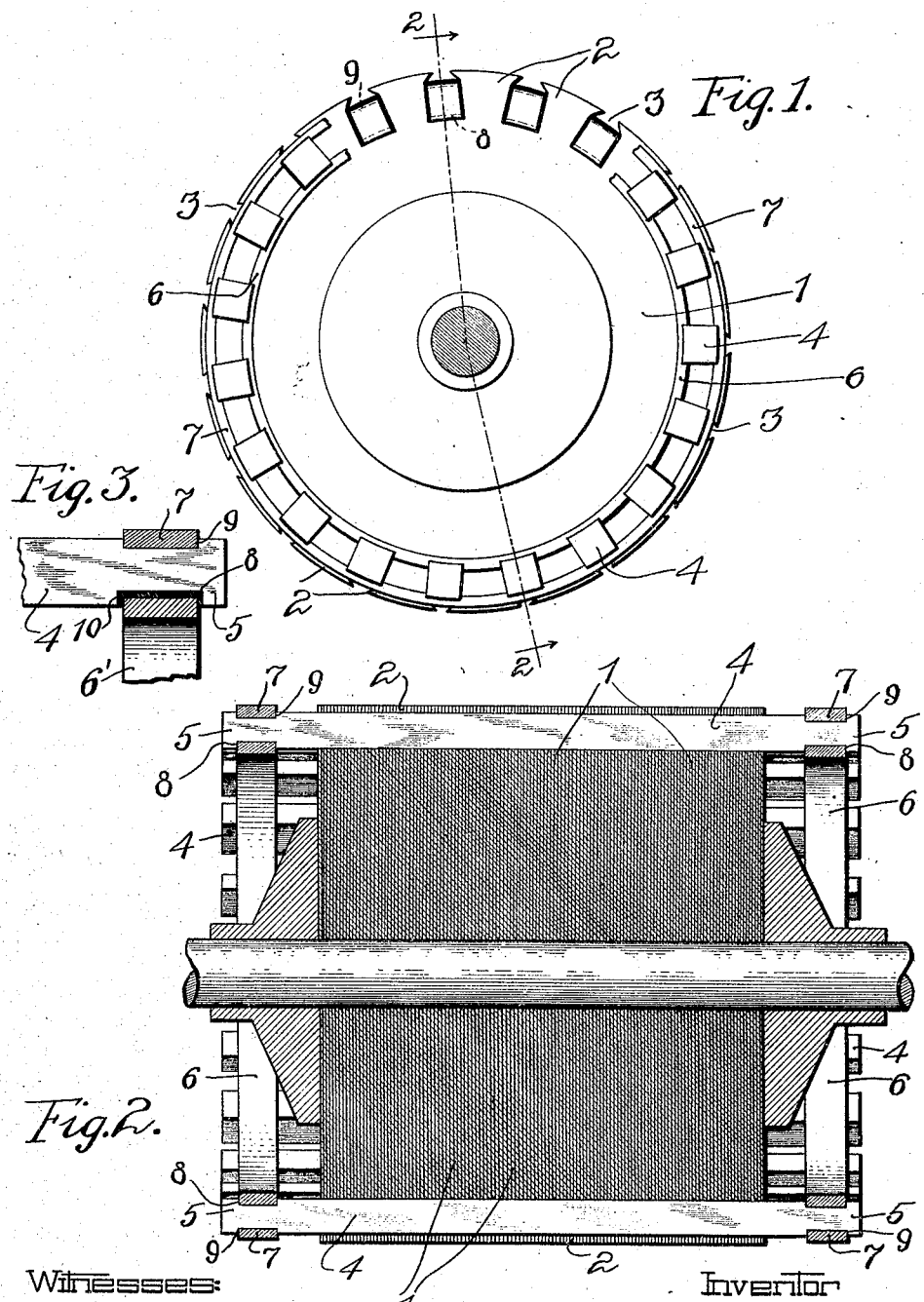
Witnesses:
Arthur H. Boettcher.
Charles J. Schmidt.
Inventor
William L. Waters
By Charles A. Brauen
Attorney.

UNITED STATES PATENT OFFICE.

WILLIAM L. WATERS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

DYNAMO-ELECTRIC MACHINERY.

No. 862,776.      Specification of Letters Patent.      Patented Aug. 6, 1907.

Application filed December 9, 1905. Serial No. 291,033.

*To all whom it may concern:*

Be it known that I, WILLIAM L. WATERS, a citizen of the United States, residing at Milwaukee, in the county of Milwaukee and State of Wisconsin, have invented a certain new and useful Improvement in Dynamo-Electric Machinery, of which the following is a full, clear, concise, and exact description, reference being had to the accompanying drawings, forming a part of this specification.

My invention relates to dynamo electric machinery, and particularly to alternating current machinery such as induction motors, and its object is to provide improved arrangement of a short-circuited or so-called squirrel cage winding for the armature thereof. A winding of this kind consists of the bars which are usually disposed within the armature slots and of short-circuiting rings which connect together the projecting ends of the bars. In prior arrangements of these windings the short circuiting rings are secured to the bar ends by being riveted thereto or secured by means of screws.

My invention contemplates a very much simplified means for connecting the bar ends with the short-circuiting rings. In my construction each short circuiting ring is in two parts, an outer ring and an inner ring, the inner ring being sprung into place to engage the inner surface of the bar, and the outer ring is first heated then slipped over the outside of the bar ends and allowed to cool to cause the bars to be securely clamped between the rings upon shrinking of the outer rings.

My invention will be best understood by reference to the accompanying drawing in which Figure 1 is an end view of an armature with the squirrel cage winding in position. Fig. 2 is a sectional view taken on line 2—2 of Fig. 1, and Fig. 3 shows a modified arrangement of short-circuiting rings and bars.

The armature which may be composed of laminations 1—1 has the teeth 2 and the slots 3. A winding or bar 4 lies in each slot and its ends 5—5 project beyond the ends of the armature. Each short-circuiting member consists of an inner ring 6 and an outer ring 7 and may be of copper or any other conducting material. The method of securing the coils in position is as follows: After the bars are properly disposed within the slots the inner rings are sprung into place to engage the inner faces of the bar ends. The outer rings 7 are then heated to be expanded sufficiently so that they may be slipped over the bar ends and upon cooling of these outer rings they will shrink and will securely clamp the bar ends against the inner rings, this arrangement being much simpler and less expensive than prior arrangements in which the short-circuiting rings were riveted or screwed to the bar ends. To further secure the rings in position a notch or groove 8 may be provided in the inner face of each bar end for receiving the inner ring, and a notch or groove 9 may also be cut in the outer face of each bar end for receiving the outer rings 7 and the rings will thus be securely held against longitudinal displacement. The grooves 8 and 9 may be directly opposite or may be displaced as desired. It is also not necessary that both rings be in electrical contact with the bars and as shown in Fig. 3 one of the rings, for instance the inner supporting ring 6′, may be insulated from the bars by interposing press-board 10 or other insulating material in the slots 8 between the inner ring and the bars. Both rings are preferably cast or welded to form a single piece and where one of them is insulated from the bars this insulating ring might be of iron or other strong material to act as a mechanical fixing ring for the other or conducting ring. Other arrangements will also suggest themselves without departing from the spirit of the invention, and I do not, therefore, wish to be limited to that herein shown and described.

What I claim as new and desire to secure by Letters Patent is:

1. In a squirrel cage armature, the combination with the conducting bars of the winding, of a short-circuiting conductor at each end for connecting together the ends of the bars, each short-circuiting conductor consisting of an outer and an inner ring between which the bar ends are clamped, there being grooves in the bars for receiving the rings.

2. In a squirrel cage armature, the combination with the conducting bars of the winding, of a short-circuiting conductor at each end of the armature for electrically uniting the bar ends, each short-circuiting conductor consisting of an inner and an outer ring, the inner ring being adapted to be sprung to engage slots in the inner sides of the bar ends, and the outer ring being adapted to be shrunk about the outside of the bar ends whereby the bar ends are securely clamped between the rings.

3. In a squirrel cage armature, the combination with the conducting bars of the winding, of a short-circuiting conductor at each end of the armature for electrically uniting the bar ends, each short-circuiting conductor consisting of an inner and an outer ring, the inner ring being adapted to be sprung to engage the inner sides of the bar ends, and the outer ring being adapted to be shrunk about the outside of the bar ends whereby the bar ends are securely clamped between the rings, there being grooves in said bars for receiving said rings to prevent lateral displacement thereof.

4. In a squirrel cage armature, the combination with the conducting bars of the winding, of a short-circuiting conductor at each end of the armature for electrically uniting the bar ends, each short-circuiting conductor consisting of an outer ring, there being slots in the inner sides of said conducting bars adapted for holding insulating material, an inner supporting ring adapted to be sprung to engage said insulating material and the outer ring being adapted to be shrunk about the outside of the bar ends whereby the bar ends are securely clamped.

5. In a squirrel cage armature, the combination with the conducting bars of the winding, of a short-circuiting conductor at each end of the armature for electrically uniting the bar ends, each short-circuiting conductor comprising an outer ring there being slots in the inner sides of said conducting bars, insulating material adapted to be placed in said slots, said material having slots, an inner supporting frame adapted to be sprung into said slots, and the outer ring being adapted to be shrunk about the outside of the bar ends whereby the bar ends are securely clamped.

In witness whereof, I hereunto subscribe my name this 1st day of Nov. A. D., 1905.

WILLIAM L. WATERS.

Witnesses:
NELLIE QUIGLEY,
JOHN E. HUBEL.